Aug. 27, 1929.  B. V. KORVIN-KROUKOVSKY  1,726,439
SEAPLANE FLOAT
Filed Feb. 9, 1928  2 Sheets-Sheet 1
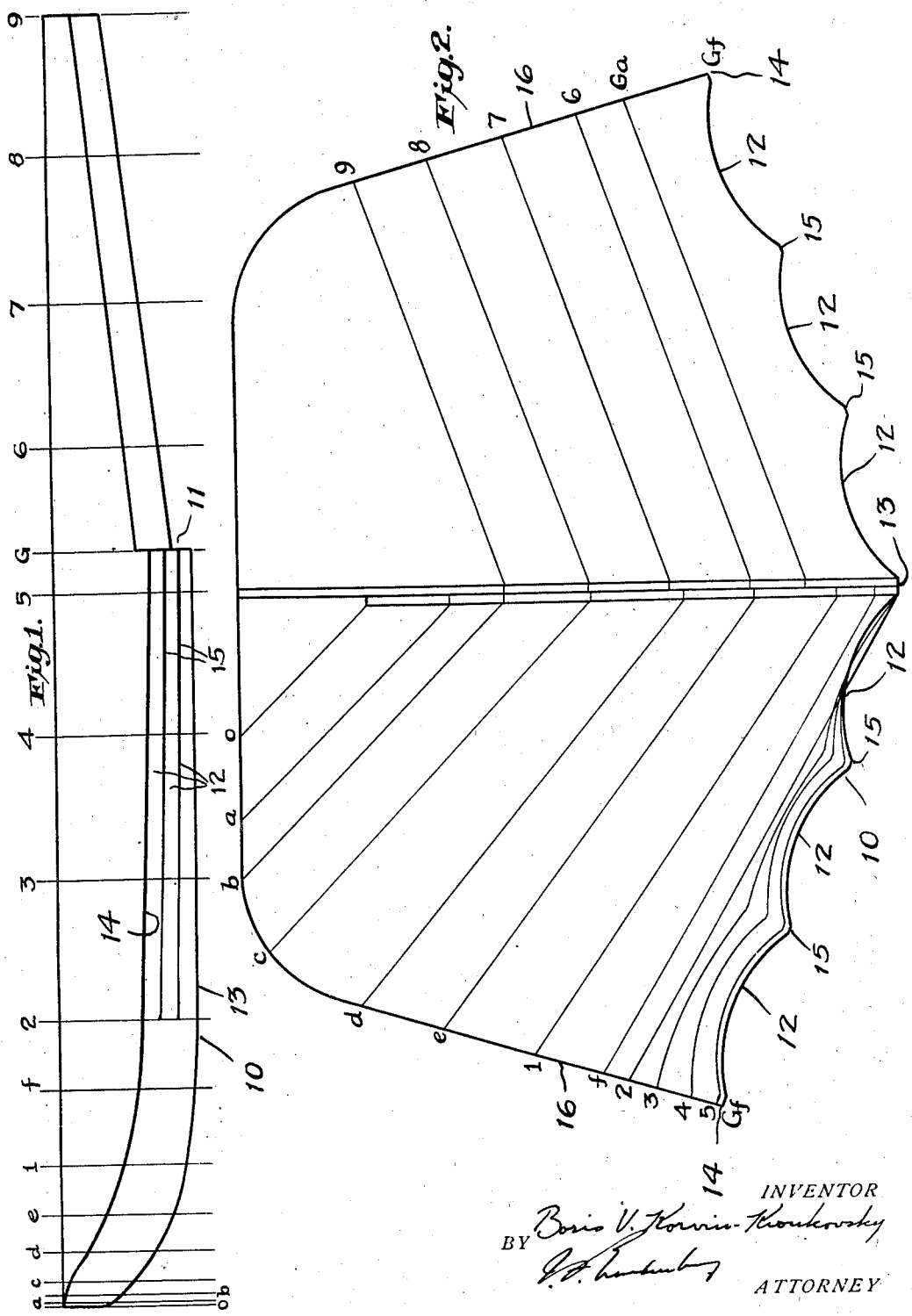

Aug. 27, 1929.    B. V. KORVIN-KROUKOVSKY    1,726,439
SEAPLANE FLOAT
Filed Feb. 9, 1928    2 Sheets-Sheet 2
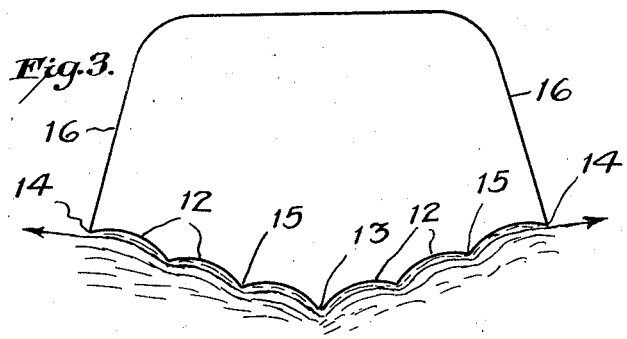
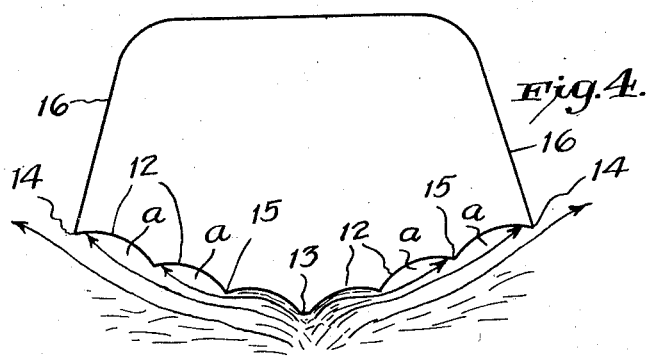
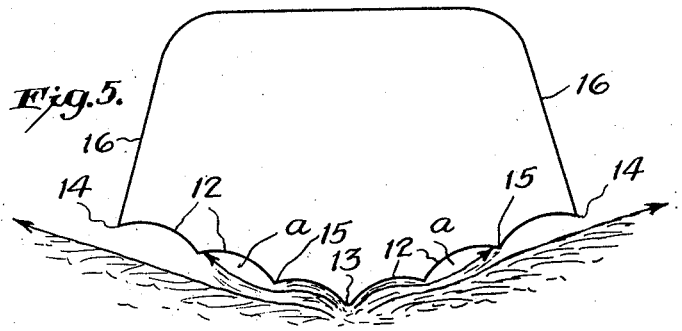
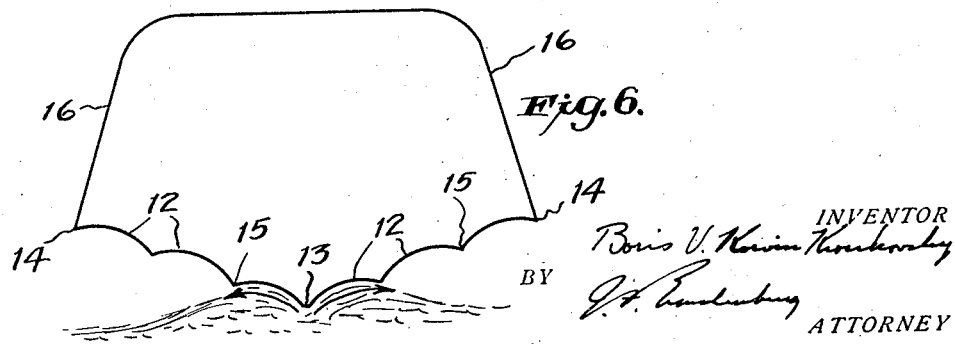

Patented Aug. 27, 1929.

1,726,439

UNITED STATES PATENT OFFICE.

BORIS V. KORVIN-KROUKOVSKY, OF NEW YORK, N. Y., ASSIGNOR TO EDO AIRCRAFT CORPORATION, OF COLLEGE POINT, LONG ISLAND, NEW YORK, A CORPORATION OF NEW YORK.

SEAPLANE FLOAT.

Application filed February 9, 1928. Serial No. 253,059.

The invention relates to the floats, pontoons or boat bodies of seaplanes or flying-boats, that is to say, to the flotation supports of aircraft which must take off from and alight on water, and the invention applies essentially to such floats which are distinctly of the V-bottom class, the advantages of the invention being obtained by the manner in which the water is allowed to escape, or is forced to move, sideways.

Before the craft can leave the water, two phases must exist, in the first of which the float must rise or be lifted up in the water, while in the second it planes substantially on top of the water until sufficient speed is attained, and then leaves the water altogether under the support and lift of the airfoils. At low speed, water friction is negligible and power is expended mainly in lifting the float up. As speed increases, the friction resistance is most important, since the power required to support the float on the surface in planing decreases as the speed increases, whereas the power required to overcome friction increases as the cube of the speed.

The object of the invention is to provide a form of seaplane float in which, at low speed, the whole bottom is in contact with the water and assists in getting the float up, or on step as it is termed, while at high speed the frictional resistance is reduced to a very low factor. Floats according to this invention are therefore suitable for seaplanes generally, and are particularly advantageous for seaplanes that have wings of small area, and consequently can take off only at high speed.

The form of float constituting the invention has the V-bottom with the usual transverse step located not far from the center of gravity. The active planing bottom, constituting some forty per cent., more or less, of the length of the float, extending from the transverse step to a region not far back of the stem, is formed or provided, at each side of the V with a few broad and shallow incurves (two or more) extending from the keel to the chine and separated from each other by substantially sharp, or narrow, ridges. These curves and ridges, which form longitudinal scallops, are so designed that, at low speed, the water in moving sideways follows the curves of the scallops, supporting the entire surfaces thereof, thus securing the best condition for getting on step. As speed increases, however, and the water is thrown outward with higher velocity, the curves direct the water so that it breaks off the ridges, which act as longitudinal steps, and shoots clear of the surfaces extending from their outer sides, the effect being that of an inverted waterfall action forming air gaps or pockets in the scallops, thereby greatly reducing the resistance at high speed and faciltating take-off.

Other features of the invention will become apparent as the specification proceeds.

In the accompanying drawings forming part hereof;

Fig. 1 is a side elevation of a float of the kind described wherein the invention is embodied;

Fig. 2 is a body plan on a larger scale, showing the transverse contour of the bottom at the several stations $o, a, b, c, d, e, l, f, 2, 3, 4, 5, G$ ($Gf$ meaning G front and $Ga$ meaning G aft), 6, 7, 8 and 9; and Figs. 3 to 6 are diagrammatic views.

The drawings show the general V form bottom 10 and the transverse step 11. For best effect the V bottom should be comparatively flattest at the step and grow progressively sharper forward from the step.

The improvement has to do more particularly with the region forward from the step, which includes the active planing bottom.

Each side of the V bottom, from the step approproximately to the station 2, is formed with longitudinal scallops forming a small number of wide and gentle incurves 12, curving inward of, that is to say above, the general line from the keel 13 to the chine 14. Two of these curves on each side may be sufficient, but three are preferred. It will be observed that these incurves are quite shallow, the length of their chords being many times their depths, and that the curves are separated from each other by comparatively narrow or sharp ridges 15.

The nature of these curves and ridges, as heretofore indicated, is to cause the water to be thrown sideways, and at the same time to be deflected downward, so that at high speed, as the airplane of which the float is a part is preparing to take off into the air, the water is caused to break from the longitudinal steps or ridges, leaving the air pockets $a$ indicated in Fig. 5, these air pockets existing substantially throughout the length of the incurved bottom sections, and admitting air freely between the planing bottom and the water, without the necessity for any special provisions for that purpose. Depending upon the speed, the water breaking from each ridge either strikes the next outer incurved surface at a point inward of the next outer ridge, or clears that ridge altogether. While the speed is increasing, the sides 16 of the float and the chines 14 are freed from the water and are raised higher and higher above the waves, the sharp break at the chine preventing the water from clinging to the sides, and the sheet of water thrown sideways and deflected downward with great velocity from the inner (more central) portions of the bottom then acting to shield the outer portions from the waves. The successive action of the incurves on the laterally moving water tends to cause it to clear the chines and the surfaces of the outermost curves entirely while it is still impinging on the outer portions of the more inwardly disposed curves, or while it may still be clinging to substantially the entirety of the innermost curves. In other words, it may be conceived that the result is to form air gaps first in the outermost curves, and, as these are lifted and shielded so as to be clear of the water, to form larger and larger air gaps or pockets in the inner curves.

An important part of the function of the scallops is to deflect downward the stream of water which flows sideways from the keel toward the chines at high speed or relatively high speeds. The large, gently curved scallops are capable of deflecting a heavy sheet of the water, the inertia of which will carry it below chine at high speed, and will protect the chine from coming in contact with the waves. The water under the float is under pressure due to the impact of the float bottom, and tends to rise on the sides of the float, but the sheet of water thrown out and down by the scallops overcomes this tendency.

This is the action at high speed. At the lower speed range the effect is quite different. At this time the object is to keep the water in contact substantially with the entire width of the bottom, in order to make it as easy as possible to get the float up in the water and on the transverse step. Therefore, the angle at the ridge dividing any two curved sections of the bottom is proportioned so as not to cause the water to break off at low speeds, but to cause it to follow the curvature in an undulating course. Thus, the advantages of reduced wetted area, and greatly reduced water cling, at high speed are obtained, not at cost of ease in getting on step at low speed, but in addition to and in combination with it.

The incurved sections of the bottom are formed within general V bottom lines, this description, though approximate, indicating an important characteristic susceptible of variation within natural limits. In the typical case all separating ridges between the incurved sections lie in the same inclined plane with the keel and chine, but there may be some deviation from this, and indeed the desired effects may be promoted by causing intermediate ridges to project somewhat below the V line, or, which amounts to the same thing, by causing outer ridges, or the chine, to recede above the V line. For practical purposes it is quite important that the chord of each outer curve be at an angle to the horizontal not less steep than the angle of the next adjacent inner curve, and the inclination of an outer curve may be of steeper angle than the inclination of an inner curve with excellent, and, if anything, better results.

At this point it may be noted that it is decidedly preferable that the incurves grow increasingly deeper as they proceed rearward, arriving at a maximum depth at the transverse step, where, nevertheless, they are still shallow, gentle and broad. At the same time, the separation between the incurved sections grows more sharply marked as the step is approached. The intermediate ridges, which at their forward regions may be substantially in the V line from keel to chine, may project more and more below that line, but not greatly, as the step is approached. Consequently at different stations, or transverse sections, somewhat different conditions may be exhibited, but on the whole the condition of the chord of an outer curve being at an angle not less steep than the chord of the next inner curve is adhered to, and the chord angles of outer curves versus inner curves may, with advantage, be made steeper the nearer to the transverse step.

It is also of practical importance that the curved sections of the bottom, and their substantially non-projecting ridges, be straight in side elevation substantially throughout the active planing portion of the bottom extending from the step forwardly. If, for example, these lines were continuously curved in side elevation, the effect would be to suck in and thereby to make take-off more difficult.

Figs. 3 to 6 illustrate somewhat imperfectly in schematic views what takes place at different times. Fig. 3 represents a low speed condition, in early process of getting on step. The float is beginning to rise and be lifted in the water but the bottom is still in complete contact with the supporting liquid. Fig. 4 illustrates a medium speed condition. The float is higher, and the water being thrown more rapidly sideways is leaving air gaps $a$ in the shallow channels, the sides of the float being quite clear of water and the laterally and upwardly springing sheet of water beginning to clear the chines and to shield them from the waves. Fig. 5 represents a high speed condition, with the chines and the outer curved bottom surfaces running clear, and air gaps in the inner channels; and Fig. 6 indicates the condition at the last moment before take off, the chine and second longitudinal step clear and the water being directed rather flatly from the innermost curves, breaking from the outer ridges of these curves entirely away from the outer sections of the bottom.

The waterfall action upon which the desired effect at high speed depends persists as long as the float, pontoon or flying boat moves with sufficient speed to throw the water sideways in a break from the ridges between the incurves. The depth of the curves and the angle between two portions of the bottom at the ridges are to be proportioned with respect to the general angle of the V bottom. The speed at which air gaps appear and the size of the air gaps for any speed will vary with these relations. The sharper the angle of the V, the more pronounced is the tendency to throw water sideways. The higher the sideways component of the water, the shallower can be the grooves, or, in other words, the depth of the always easy and shallow grooves is inversely proportional to the angle of the sides of the V to the horizontal. Therefore, as the angle of the V grows flatter rearward to the transverse step, we see the grooves or incurves preferably growing deeper, and their sides steeper. The sloping surfaces at each side of a ridge may, thus, be considered as a small V bottom; therefore, the flatter the V bottom as a whole, the steeper should be the individual V's, and vice-versa.

The accomplishment of the whole result therefore involves making the incurves broad and easy and shallow enough, in a general V bottom, so that at low speed the whole bottom is in contact with water and assists in getting on step, whereas at higher speeds these same curved sections cause the laterally thrown water to break from the longitudinal steps and leave air gaps which greatly reduce the resistance to take-off. The precise curves or angles for a particular float can easily be determined.

Experience indicates that when the shape is such that the lateral velocity of the water after leaving an inner ridge causes the stream of it, after leaving that ridge, to impinge on the surface of the next outer curve at an angle of approximately 7°, or to clear it at about that angle, the maximum of lift is obtained with the least resistance, and that the resistance tends to increase if this angle is much less or much more than 7°.

Due to the shallowness of the incurves the bottom differs very little in area from a straight V bottom wherein cushioning effect is obtained by allowing water to escape sideways, therefore the frictional resistance is not appreciably increased.

It will be apparent that the advantage of my invention in respect to high speeds and getting off the water are in contradistinction to holding the water and compelling it to flow lengthwise, and also that it is not dependent on trapping air, but on waterfall action at the ridges as the water gets outward motion. After the water comes off the break in the surface or ridge between two of the curved surfaces and either impinges on the far side of the next section or clears it, it continues to travel in the same general outward direction and does not flood the air space left on the near side of the next outer section.

At low speed the invention has all the advantage of the normal V bottom, plus the constant tendency to deflect water downward as well as outward, thereby shortening the period of the low speed range, and thereafter greatly curtailing the time during which the seaplane or flying boat must skim the water before actually taking off, also making it possible to take off with less wing area than would otherwise be required.

I claim:

1. A seaplane float of the V-bottom class having a transverse step not far from the center of gravity, each side of the bottom being shaped with a few large scallops which extend longitudinally from a region near the stem rearward to the transverse step, said scallops exhibiting in cross section a series of broad and shallow inward curves extending between the keel and the chine and separated from each other by substantially sharp or narrow ridges, the scallops being adapted to throw water sideways and downward with consequent formation of air gaps in the scallops as the result of water breaking off the ridges at high planing speed, whereby to reduce frictional resistance during take-off, the slope of the scallops outward away from the ridges being such as to keep the water from breaking off the ridges at low speed while the float is getting on the step.

2. A seaplane float of the V-bottom class having a transverse step not far from the center of gravity, each side of the bottom being shaped with a few large scallops which extend longitudinally from a region near the stem rearward to the transverse step and which are substantially straight and continuous in side elevation in the active planing area, said scallops exhibiting in cross section a series of broad and shallow inward curves extending between the keel and the chine and separated from each other by substantially sharp or narrow ridges, the scallops being adapted to throw water sideways and downward with consequent formation of air gaps in the scallops as the result of water breaking off the ridges at high planing speed, whereby to reduce frictional resistance during take-off, the slope of the scallops outward away from the ridges being such as to keep the water from breaking off the ridges at low speed while the float is getting on the step.

3. A seaplane float of the V-bottom class having a transverse step not far from the center of gravity, each side of the bottom being shaped with a few large scallops which extend longitudinally from a region near the stem rearward to the transverse step and which are substantially straight and continuous in side elevation in the active planing area, said scallops growing deeper toward the step while their separation grows more strongly marked, said scallops exhibiting in cross section a series of broad and shallow inward curves extending between the keel and the chine and separated from each other by substantially sharp or narrow ridges, the scallops being adapted to throw water sideways and downward with consequent formation of air gaps in the scallops as the result of water breaking off the ridges at high planing speed, whereby to reduce frictional resistance during take-off, the slope of the scallops outward away from the ridges being such as to keep the water from breaking off the ridges at low speed while the float is getting on the step.

4. A seaplane float of the V-bottom class having a transverse step not far from the center of gravity, the bottom being flattest at the step and growing sharper forward, each side of the bottom being shaped with a few large scallops which extend longitudinally from a region near the stem rearward to the transverse step and which are substantially straight in side elevation in the active planing area, said scallops growing deeper toward the step while their separation grows more strongly marked, said scallops exhibiting in cross section a series of broad and shallow inward curves extending between the keel and the chine and separated from each other by substantially sharp or narrow ridges, the scallops being adapted to throw water sidways and downward with consequent formation of air gaps in the scallops as the result of water breaking off the ridges at high planing speed, whereby to reduce frictional resistance during take-off, the slope of the scallops outward away from the ridges being such as to keep the water from breaking off the ridges at low speed while the float is getting on the step.

BORIS V. KORVIN-KROUKOVSKY.